(12) United States Patent
Moe et al.

(10) Patent No.: US 12,296,971 B2
(45) Date of Patent: May 13, 2025

(54) SEGMENTED NACELLE INLET LIP WITH ELECTRIC ANTI-ICING SYSTEM

(71) Applicant: Rohr, Inc., Chula Vista, CA (US)

(72) Inventors: Jeffrey W. Moe, Chula Vista, CA (US); John E. Van Doren, San Diego, CA (US); Aleksandar Ratajac, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 18/231,572

(22) Filed: Aug. 8, 2023

(65) Prior Publication Data
US 2025/0051025 A1    Feb. 13, 2025

(51) Int. Cl.
| | |
|---|---|
| *B64D 33/02* | (2006.01) |
| *B64D 15/12* | (2006.01) |
| *F01D 25/02* | (2006.01) |
| *F01D 25/24* | (2006.01) |
| *F02C 7/04* | (2006.01) |

(52) U.S. Cl.
CPC ............ *B64D 33/02* (2013.01); *B64D 15/12* (2013.01); *F01D 25/02* (2013.01); *F01D 25/243* (2013.01); *F02C 7/04* (2013.01); *B64D 2033/0233* (2013.01)

(58) Field of Classification Search
CPC ............ B64D 15/12; B64D 33/02; F02C 7/04
See application file for complete search history.

(56) References Cited

U.S. PATENT DOCUMENTS

| | | | | |
|---|---|---|---|---|
| 5,609,313 A | * | 3/1997 | Cole | ............ B64D 29/00 244/54 |
| 7,469,862 B2 | | 12/2008 | Layland | |
| 7,513,458 B2 | | 4/2009 | Layland | |
| 7,588,212 B2 | * | 9/2009 | Moe | ............ B64D 15/12 244/134 D |
| 7,923,668 B2 | | 4/2011 | Layland | |

(Continued)

FOREIGN PATENT DOCUMENTS

FR    2836182 B1    10/2005

OTHER PUBLICATIONS

EP Search Report for EP Patent Application No. 24193683.0 dated Nov. 12, 2024.

(Continued)

*Primary Examiner* — Lorne E Meade
(74) *Attorney, Agent, or Firm* — Getz Balich LLC (57) ABSTRACT

An assembly is provided for an aircraft propulsion system. This assembly includes a nacelle inlet structure which extends axially along and circumferentially around a centerline. The nacelle inlet structure includes an inlet lip, an inner barrel, an outer barrel and a plurality of structure segments. The inlet lip forms a leading edge of the nacelle inlet structure. The inner barrel projects axially aft away from the inlet lip. The outer barrel projects axially aft away from the inlet lip. The outer barrel is radially outboard of and axially overlaps the inner barrel. Each of the structure segments includes an exterior skin, a mount and an electric heater configured to heat the exterior skin. The exterior skin forms a respective circumferential section of the inlet lip and a respective circumferential section of the outer barrel. The mount is bonded to the exterior skin and mechanically attached to the inner barrel.

20 Claims, 11 Drawing Sheets

(56) References Cited

U.S. PATENT DOCUMENTS

| | | | |
|---|---|---|---|
| 8,540,185 B2* | 9/2013 | Vauchel | F02C 7/047 |
| | | | 244/53 B |
| 8,740,137 B2 | 6/2014 | Vauchel | |
| 9,102,413 B2 | 8/2015 | Porte | |
| 9,403,599 B2 | 8/2016 | Binks | |
| 9,567,905 B2 | 2/2017 | Porte | |
| 9,764,849 B2* | 9/2017 | Stark | B64D 29/00 |
| 10,160,552 B2 | 12/2018 | Crawford | |
| 11,008,109 B2 | 5/2021 | Khuong | |
| 11,414,203 B2 | 8/2022 | Sanz Martinez | |
| 11,591,098 B2* | 2/2023 | Vinches | B64D 29/08 |
| 2005/0006529 A1 | 1/2005 | Moe | |
| 2006/0145001 A1 | 7/2006 | Smith | |
| 2006/0237582 A1 | 10/2006 | Layland | |
| 2009/0134272 A1 | 5/2009 | Vauchel | |
| 2012/0126062 A1 | 5/2012 | Stewart, III | |
| 2016/0377090 A1 | 12/2016 | Brown | |
| 2017/0107905 A1* | 4/2017 | Brown | B23K 20/126 |
| 2019/0193833 A1* | 6/2019 | Vinches | B64D 29/08 |
| 2019/0291878 A1 | 9/2019 | Kestler | |
| 2020/0017191 A1 | 1/2020 | Porte | |
| 2020/0290747 A1 | 9/2020 | Delsol | |
| 2022/0041295 A1 | 2/2022 | Ferrier | |
| 2024/0367802 A1 | 11/2024 | Sherman | |

OTHER PUBLICATIONS

EP Search Report for EP Patent Application No. 24193548.5 dated Nov. 18, 2024.
EP Search Report for EP Patent Application No. 24193602.0 dated Nov. 27, 2024.
EP Search Report for EP Patent Application No. 24193695.4 dated Feb. 5, 2025.

* cited by examiner

SEGMENTED NACELLE INLET LIP WITH ELECTRIC ANTI-ICING SYSTEM

BACKGROUND

1. Technical Field

This disclosure relates generally to an aircraft propulsion system and, more particularly, to a nacelle inlet structure with, for example, an electric anti-icing system.

2. Background Information

A nacelle for an aircraft propulsion system may include an electric anti-icing system for reducing/preventing ice accumulation on an inlet lip of the nacelle. Various types and configurations of anti-icing systems as well as inlet lips are known in the art. While these known anti-icing systems and inlet lips have various benefit, there is still room in the art for improvement.

SUMMARY OF THE DISCLOSURE

According to an aspect of the present disclosure, an assembly is provided for an aircraft propulsion system. This assembly includes a nacelle inlet structure which extends axially along and circumferentially around a centerline. The nacelle inlet structure includes an inlet lip, an inner barrel, an outer barrel and a plurality of structure segments. The inlet lip forms a leading edge of the nacelle inlet structure. The inner barrel projects axially aft away from the inlet lip. The outer barrel projects axially aft away from the inlet lip. The outer barrel is radially outboard of and axially overlaps the inner barrel. Each of the structure segments includes an exterior skin, a mount and an electric heater configured to heat the exterior skin. The exterior skin forms a respective circumferential section of the inlet lip and a respective circumferential section of the outer barrel. The mount is bonded to the exterior skin and mechanically attached to the inner barrel.

According to another aspect of the present disclosure, another assembly is provided for an aircraft propulsion system. This assembly includes a nacelle inlet structure which extends axially along and circumferentially around a centerline. The nacelle inlet structure includes an inlet lip, an inner barrel, an outer barrel, a bulkhead, a plurality of structure segments and an internal cavity. The inlet lip forms a leading edge of the nacelle inlet structure. The inner barrel projects axially aft away from the inlet lip. The outer barrel projects axially aft away from the inlet lip. The outer barrel is radially outboard of and axially overlaps the inner barrel. The bulkhead is connected to the inner barrel and the outer barrel. The bulkhead radially tapers as the bulkhead extends axially towards the leading edge. Each of the structure segments is attached to the inner barrel and the bulkhead. Each of the structure segments includes an exterior skin. The exterior skin forms a respective circumferential section of the inlet lip. The internal cavity extends axially within the nacelle inlet structure from the exterior skin of each of the structure segments to the bulkhead.

According to still another aspect of the present disclosure, another assembly is provided for an aircraft propulsion system. This assembly includes a nacelle inlet structure which extends axially along and circumferentially around a centerline. The nacelle inlet structure includes an inlet lip, an inner barrel, an outer barrel, a bulkhead, a plurality of structure segments and an internal cavity. The inlet lip forms a leading edge of the nacelle inlet structure. The inner barrel projects axially aft away from the inlet lip. The outer barrel projects axially aft away from the inlet lip. The outer barrel is radially outboard of and axially overlaps the inner barrel. The bulkhead is connected to the inner barrel and the outer barrel. Each of the structure segments is attached to the inner barrel and the bulkhead. Each of the structure segments includes an exterior skin. The exterior skin forms a respective circumferential section of the inlet lip and a respective circumferential section of the outer barrel. The internal cavity extends axially within the nacelle inlet structure from the exterior skin of each of the structure segments to the bulkhead. The internal cavity extends radially within the nacelle inlet structure from the inner barrel to the outer barrel.

Each of the structure segments may also include an electric heater attached to or integrated with the exterior skin.

Each of the structure segments may also include a mount bonded to the exterior skin and mechanically attached to the bulkhead and the inner barrel.

The exterior skin may also form a respective circumferential section of the outer barrel.

The exterior skin may be discrete from and may be axially adjacent the outer barrel. The exterior skin may be attached to the bulkhead.

The structure segments may be arranged circumferentially side-by-side around the centerline in an array to collectively form the inlet lip and the outer barrel.

The exterior skin may include an inner lip section, an outer lip section and an outer barrel section. The inner lip section may extend from the leading edge to an inner aft end of the exterior skin. The mount may be bonded to the inner lip section. The outer lip section may extend from the leading edge to the outer barrel section. The outer lip section may be radially outboard of and axially overlap the inner lip section. The outer barrel section may extend from the outer lip section to an outer aft end of the exterior skin. The outer barrel section may be radially outboard of and axially overlap the inner barrel.

The nacelle inlet structure may also include an internal cavity. The internal cavity may extend radially from the inner lip section to the outer lip section.

The nacelle inlet structure may also include a bulkhead connected to the inner barrel and the outer barrel. The internal cavity may extend axially from the bulkhead to an intersection between the inner lip section and the outer lip section.

The internal cavity may extend radially from the bulkhead to the outer barrel section.

The bulkhead may be connected to the inner barrel at a forward end of the inner barrel. The bulkhead may be connected to the outer barrel at the outer aft end of the exterior skin.

The bulkhead may extend in a radially inward and axially forward direction from the outer barrel to the inner barrel.

The bulkhead may extend in a radially inward and axially aft direction from the outer barrel to the inner barrel.

A fastener may project through the outer barrel section and a flange of the bulkhead.

A fastener may project through the mount and a flange of the bulkhead.

The internal cavity may also extend radially from the inner barrel to the outer barrel section.

A fastener may mechanically attach the mount to the inner barrel.

A pin may mechanically attach the mount to the inner barrel.

The assembly may also include a seal element engaged with and axially between the mount and the inner barrel.

The exterior skin may be configured from or otherwise include metal.

The exterior skin may be configured from or otherwise include fiber-reinforced composite material.

The electric heater may be connected to the exterior skin along an interior surface of the exterior skin.

The electric heater may be integrated with the exterior skin.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
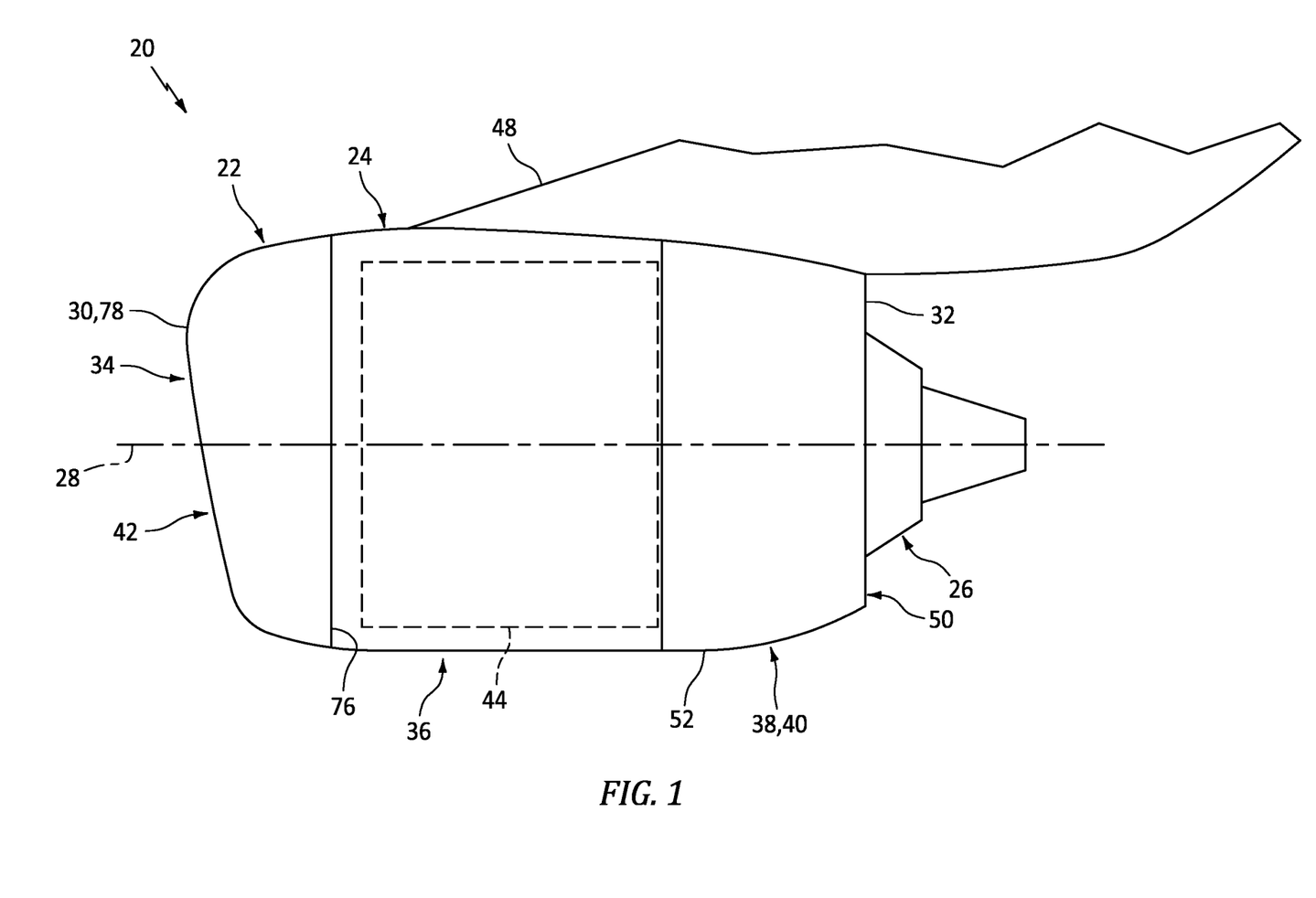
FIG. 1 is a side illustration of an aircraft propulsion system with a pylon.

FIG. 1 illustrates an aircraft propulsion system 20 for an aircraft such as, but not limited to, a commercial airliner or a cargo plane. The aircraft propulsion system 20 includes a nacelle 22 and a gas turbine engine. This gas turbine engine may be configured as a high-bypass turbofan engine. Alternatively, the gas turbine engine may be configured as a turbojet engine or any other type of gas turbine engine capable of propelling the aircraft during flight.

The nacelle 22 is configured to house and provide an aerodynamic cover for the gas turbine engine. The nacelle 22 of FIG. 1, for example, includes a nacelle outer structure 24 and a nacelle inner structure 26; e.g., an inner fixed structure (IFS).

Figure 2:
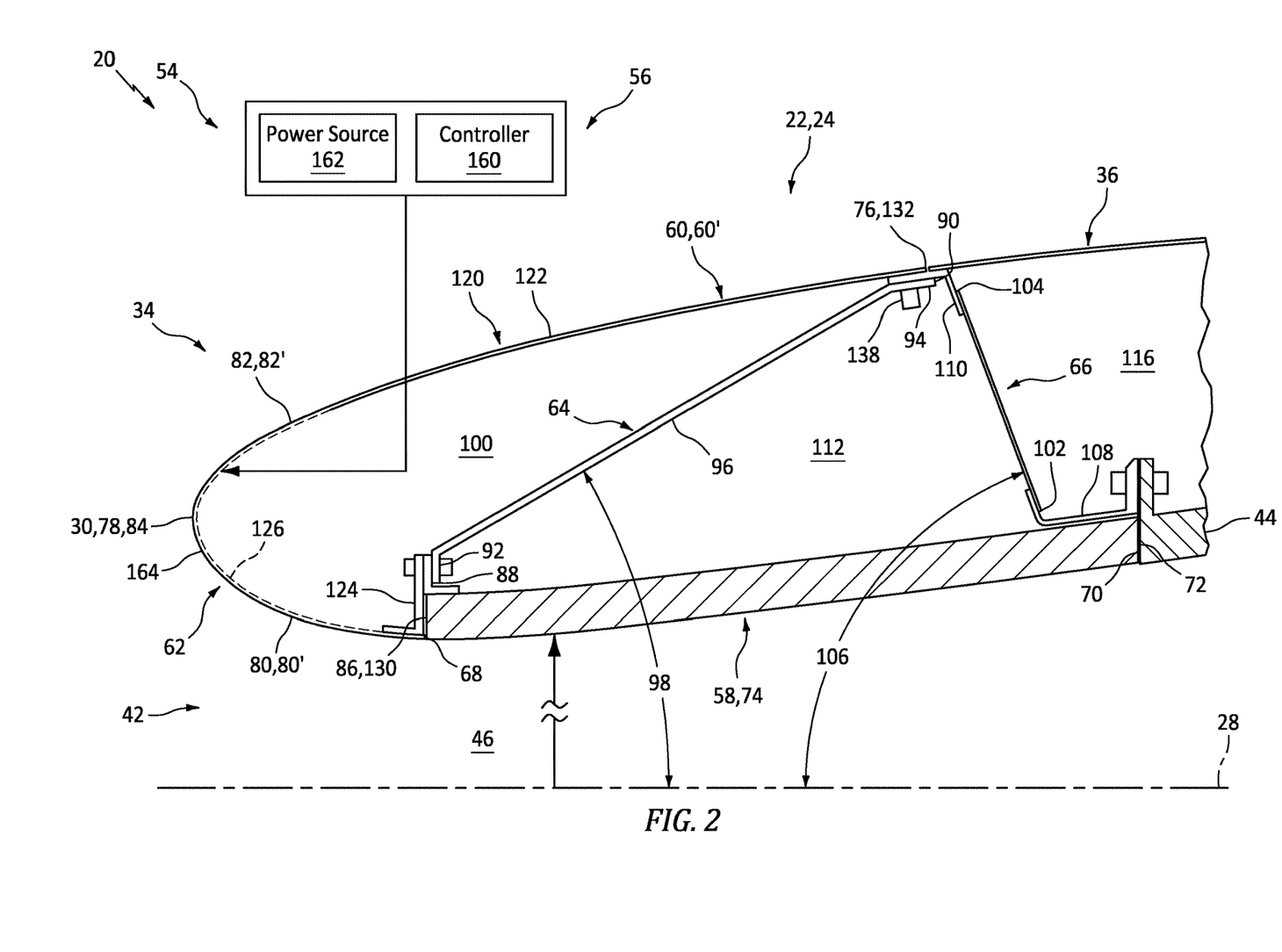
FIG. 2 is a partial sectional illustration of the propulsion system at a nacelle inlet structure with an electric anti-icing system.

The outer structure 24 extends axially along an axial centerline 28 between an upstream, forward end 30 of the nacelle 22 and its outer structure 24 and a downstream, aft end 32 of the outer structure 24. Briefly, the axial centerline 28 may be a centerline axis of the nacelle 22 and/or the gas turbine engine, and/or a rotational axis for one or more rotating components (e.g., spools) of the gas turbine engine. The outer structure 24 of FIG. 1 includes a nacelle inlet structure 34, one or more nacelle fan cowls 36 (one cowl visible in FIG. 1) and a nacelle aft structure 38, which nacelle aft structure 38 may be configured as part of or include a thrust reverser system 40. The aircraft propulsion system 20, however, may be configured without the thrust reverser system 40 in other embodiments.

The inlet structure 34 is disposed at the nacelle forward end 30. The inlet structure 34 is configured to direct a stream of air through an inlet opening 42 (see also FIG. 2) at the nacelle forward end 30 into the aircraft propulsion system 20 and towards a fan section of the gas turbine engine.

The fan cowls 36 are disposed axially between the inlet structure 34 and the aft structure 38. Each fan cowl 36 of FIG. 1, in particular, is disposed at an aft end of a stationary portion of the nacelle 22, and each fan cowl 36 extends forward to the inlet structure 34. Each fan cowl 36 is generally axially aligned with the fan section of the gas turbine engine. The fan cowls 36 are configured to provide an aerodynamic covering for a fan case 44, which fan case 44 circumscribes a fan rotor within the fan section and may partially form an outer peripheral boundary of a flowpath 46 (see FIG. 2) of the aircraft propulsion system 20.

The term "stationary portion" is used above to describe a portion of the nacelle 22 that is stationary during propulsion system operation (e.g., during aircraft takeoff, aircraft flight and aircraft landing). However, the stationary portion may be otherwise movable for inspection/maintenance of the aircraft propulsion system 20; e.g., when the aircraft propulsion system 20 is non-operational. Each of the fan cowls 36, for example, may be configured to provide access to components of the gas turbine engine such as the fan case 44 and/or peripheral equipment arranged with the fan case 44 for inspection, maintenance and/or otherwise. In particular, each of the fan cowls 36 may be pivotally mounted with the aircraft propulsion system 20 (e.g., to a pylon structure 48) by, for example, a pivoting hinge system. The present disclosure, however, is not limited to the foregoing fan cowl configurations and/or access schemes.

The aft structure 38 of FIG. 1 is disposed at the structure aft end 32. The aft structure 38 is configured to form a bypass exhaust 50 for a bypass flowpath with the inner structure 26. The aft structure 38 may include one or more translating sleeves 52 (one sleeve visible in FIG. 1) for the thrust reverser system 40. The present disclosure, however, is not limited to such a translating sleeve thrust reverser system.

FIG. 2 illustrates an assembly 54 for the aircraft propulsion system 20. This propulsion system assembly 54 includes the inlet structure 34, the fan cowls 36 (one cowl visible in FIG. 2) and the fan case 44. The propulsion system assembly 54 also includes an electric anti-icing system 56.

The inlet structure 34 of FIG. 2 includes an inner barrel 58, an outer barrel 60, an inlet lip 62 (e.g., a nose lip), and one or more bulkheads 64 and 66. The inlet structure 34 of FIG. 2 also includes one or more components of the anti-icing system 56.

The inner barrel 58 extends axially along the axial centerline 28 from an upstream, forward end 68 of the inner barrel 58 to a downstream, aft end 70 of the inner barrel 58. The inner barrel 58 extends circumferentially about (e.g., completely around) the axial centerline 28. The inner barrel 58 may thereby have a full-hoop (e.g., tubular) geometry. At (e.g., on, adjacent or proximate) the inner barrel aft end 70, the inner barrel 58 of FIG. 2 is mechanically fastened and/or otherwise attached to the fan case 44 at an upstream, forward end 72 of the fan case 44.

The inner barrel 58 may be configured to attenuate sound (e.g., noise) generated during operation of the aircraft propulsion system 20 and, more particularly for example, sound generated by rotation of the fan rotor within the fan section. The inner barrel 58 of FIG. 2, for example, includes at least one tubular acoustic panel 74 or an array of arcuate acoustic panels 74 arranged circumferentially about the axial centerline 28. Each acoustic panel 74 may include a cellular (e.g., honeycomb) core bonded to and radially between a perforated face sheet and a non-perforated back sheet, where the perforated face sheet faces radially inward and forms an outer peripheral boundary for an axial portion of the flowpath 46. Of course, various other acoustic panel types and configurations are known in the art, and the present disclosure is not limited to any particular ones thereof.

The outer barrel 60 extends axially along the axial centerline 28 to a downstream, aft end 76 of the outer barrel 60. The outer barrel 60 extends circumferentially about (e.g., completely around) the axial centerline 28. The outer barrel 60 may thereby have a full-hoop (e.g., tubular) geometry. The outer barrel 60 is spaced radially outboard of and axially overlaps the inner barrel 58. The outer barrel 60 thereby circumscribes the inner barrel 58. The outer barrel 60 of FIG. 2 is also radially outboard of and axially overlaps at least a portion or an entirety of each of the bulkheads 64 and 66. The outer barrel 60 thereby circumscribes each of the bulkheads 64 and 66. At the outer barrel aft end 76, the outer barrel 60 is (e.g., removably) mechanically attached to and supported by one or more of the bulkheads 64 and 66 as described below in further detail.

The inlet lip 62 forms a leading edge 78 of the nacelle 22 as well as the inlet opening 42 into the aircraft propulsion system 20 (see FIG. 1), where the leading edge 78 is located at the nacelle forward end 30. The inlet lip 62 has a cupped (e.g., generally U-shaped or V-shaped or J-shaped) cross-sectional geometry which extends circumferentially around the axial centerline 28. The inlet lip 62 includes an inner lip portion 80 and an outer lip portion 82.

The inner lip portion 80 extends longitudinally (e.g., radially inwards towards and/or axially along the axial centerline 28) from an intersection 84 with the outer lip portion 82 at the leading edge 78 to an inner downstream, aft end 86 ("inner aft end") of the inlet lip 62 and its inner lip portion 80. The inner lip portion 80 extends circumferentially about (e.g., completely around) the axial centerline 28. The inner lip portion 80 may thereby have a full-hoop (e.g., annular and/or tubular) geometry. The inlet lip inner aft end 86 is disposed axially adjacent the inner barrel forward end 68. At the inlet lip inner aft end 86, the inlet lip 62 and its inner lip portion 80 are (e.g., removably) mechanically attached to and supported by the inner barrel 58 and/or the forward bulkhead 64 as described below in further detail.

The outer lip portion 82 extends longitudinally (e.g., radially outwards away from and/or axially along the axial centerline 28) from the intersection 84 with the inner lip portion 80 at the leading edge 78 to the outer barrel 60. As the outer lip portion 82 extends axially towards (e.g., to) the outer barrel 60, the outer lip portion 82 axially overlaps and diverges radially away from (in a radial outward direction away from the axial centerline 28) the inner lip portion 80. The outer lip portion 82 extends circumferentially about (e.g., completely around) the axial centerline 28. The outer lip portion 82 may thereby have a full-hoop (e.g., tubular) geometry and circumscribe the inner lip portion 80.

The forward bulkhead 64 extends vertically from an inner end 88 of the forward bulkhead 64 to an outer end 90 of the forward bulkhead 64. The forward bulkhead inner end 88 of FIG. 2 is disposed axially forward of the forward bulkhead outer end 90 along the axial centerline 28 and, thus, also forms a forward end of the forward bulkhead 64. Similarly, the forward bulkhead outer end 90 of FIG. 2 is disposed axially aft of the forward bulkhead inner end 88 along the axial centerline 28 and, thus, also forms an aft end of the forward bulkhead 64. The forward bulkhead 64 extends circumferentially about (e.g., completely around) the axial centerline 28. The forward bulkhead 64 may thereby have a full-hoop (e.g., annular) geometry.

The forward bulkhead 64 of FIG. 2 includes a forward, inner flange 92, an aft, outer flange 94 and a web 96. The forward bulkhead inner flange 92 is disposed at the forward bulkhead inner end 88. The forward bulkhead outer flange 94 is disposed at the forward bulkhead outer end 90. The forward bulkhead web 96 extends radially outwards away from the axial centerline 28 and axially along the axial centerline 28 from the forward bulkhead inner flange 92 to the forward bulkhead outer flange 94. The forward bulkhead web 96 of FIG. 2, for example, has a frustoconical geometry which radially tapers inward as the forward bulkhead 64 extends axially (in an axial forward direction along the axial centerline 28) from (or about) the forward bulkhead outer flange 94 to (or about) the forward bulkhead inner flange 92. The forward bulkhead 64 and its forward bulkhead web 96, for example, have a canted configuration where the forward bulkhead 64 and its forward bulkhead web 96 are angularly offset from the axial centerline 28 by a forward bulkhead offset angle 98. This forward bulkhead offset angle 98 is a non-zero acute angle such as, but not limited to, between twenty degrees (20°) and seventy degrees (70°); e.g., between thirty degrees (30°) and forty-five degrees (45°). The present disclosure, however, is not limited to such an exemplary arrangement.

The forward bulkhead inner flange 92 is (e.g., removably) mechanically attached to the inlet lip 62 and/or the inner barrel 58 as described below in further detail. The forward bulkhead outer flange 94 is (e.g., removably) mechanically attached to the outer barrel 60 and/or the aft bulkhead 66 as described below in further detail. With this arrangement, the inlet structure 34 includes a forward internal cavity 100 ("forward cavity"). This forward cavity 100 extends radially within the inlet lip 62 from the inner lip portion 80 to the outer lip portion 82. The forward cavity 100 of FIG. 2 also extends radially from an outer side of the forward bulkhead web 96 to an inner side of the outer barrel 60. The forward cavity 100 extends axially along the axial centerline 28 between the inlet lip 62 and the forward bulkhead 64. More particularly, the forward cavity 100 extends axially from the outer side of the forward bulkhead 64 to the inner lip portion 80 and the outer lip portion 82 at the intersection 84 between those lip portions 80 and 82. The forward cavity 100 extends circumferentially about (e.g., completely around) the axial centerline 28. The forward cavity 100 may thereby have a full-hoop (e.g., annular) geometry within the inlet structure 34.

The aft bulkhead 66 extends vertically from an inner end 102 of the aft bulkhead 66 to an outer end 104 of the aft bulkhead 66. The aft bulkhead inner end 102 of FIG. 2 is disposed axially aft of the aft bulkhead outer end 104 along the axial centerline 28 and, thus, also forms an aft end of the aft bulkhead 66. Similarly, the aft bulkhead outer end 104 of FIG. 2 is disposed axially forward of the aft bulkhead inner end 102 along the axial centerline 28 and, thus, also forms a forward end of the aft bulkhead 66. The aft bulkhead 66 extends circumferentially about (e.g., completely around) the axial centerline 28. The aft bulkhead 66 may thereby have a full-hoop (e.g., annular) geometry.

The aft bulkhead 66 of FIG. 2 extends radially outwards away from the axial centerline 28 and axially along the axial centerline 28 from the aft bulkhead inner end 102 to the aft bulkhead outer end 104. The aft bulkhead 66 of FIG. 2, for example, has a frustoconical geometry which radially tapers inward as the aft bulkhead 66 extends axially (in an axial aft direction along the axial centerline 28) from (or about) the aft bulkhead outer end 104 to (or about) the aft bulkhead inner end 102. The aft bulkhead 66, for example, has a canted configuration where the aft bulkhead 66 is angularly offset from the axial centerline 28 by an aft bulkhead offset angle 106. This aft bulkhead offset angle 106 is a non-zero acute angle less than ninety degrees (90°) and greater than or equal to seventy degrees (70°). The present disclosure, however, is not limited to such an exemplary arrangement. The aft bulkhead 66, for example, may alternatively be arranged perpendicular to the axial centerline 28 in other embodiments.

At the aft bulkhead inner end 102, the aft bulkhead 66 is attached to the inner barrel 58 through, for example, an inner mounting structure 108; e.g., a channeled attach ring. This inner mounting structure 108 may also facilitate the attachment of the inner barrel 58 to the fan case 44. At the aft bulkhead outer end 104, the aft bulkhead 66 is attached to outer barrel 60 and/or the forward bulkhead 64 through, for example, an outer mounting structure 110; e.g., an L-shaped attach ring. With this arrangement, the inlet structure 34 includes an aft internal cavity 112 ("aft cavity"). This aft cavity 112 extends radially within the inlet structure 34 from the inner barrel 58 to one or more of the bulkheads 64 and 66. The aft cavity 112 extends axially along the axial centerline 28 from the forward bulkhead 64 to the aft bulkhead 66. The aft cavity 112 extends circumferentially about (e.g., completely around) the axial centerline 28. The aft cavity 112 may thereby have a full-hoop (e.g., annular) geometry within the inlet structure 34.

Figure 3:
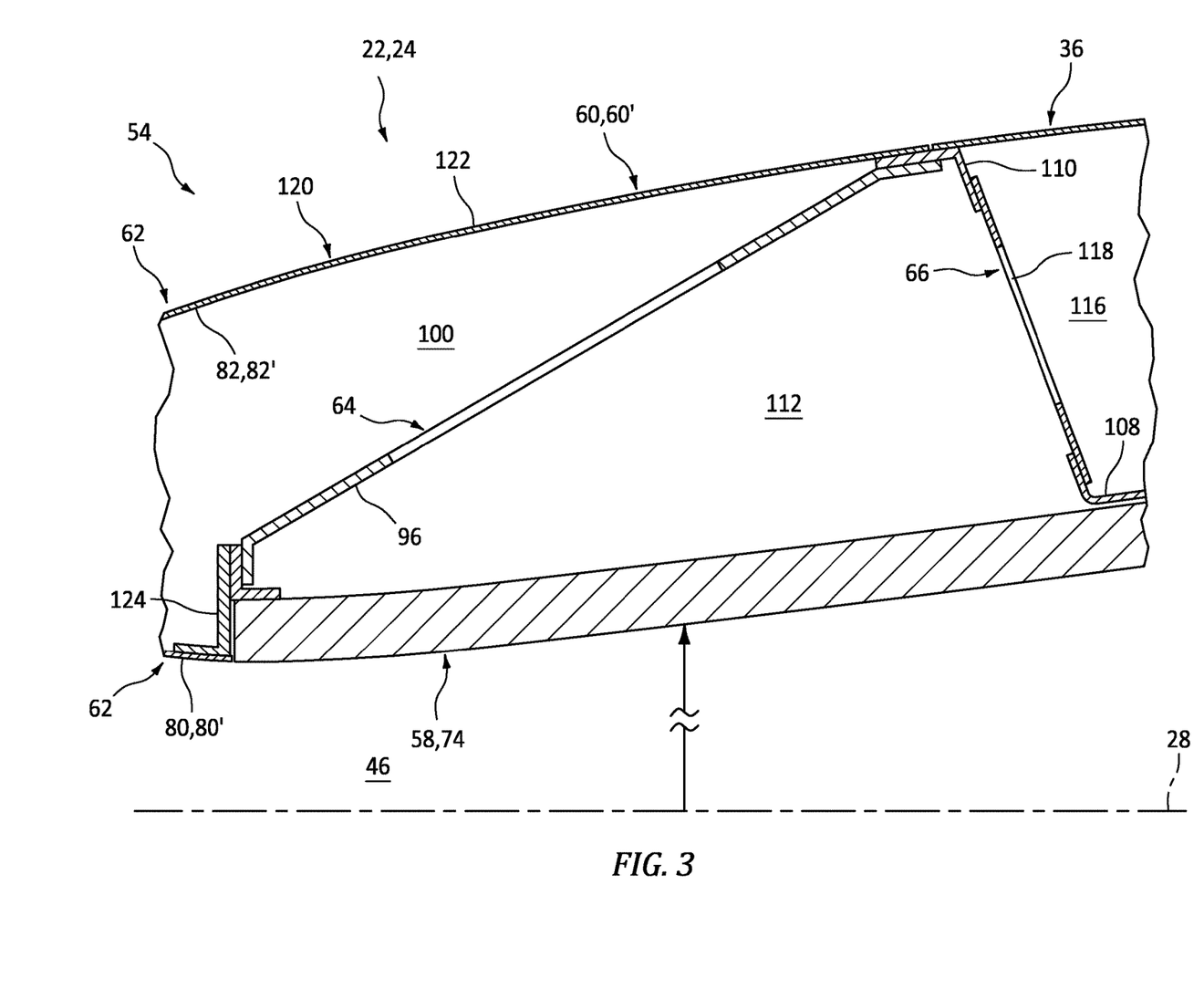
FIG. 3 is a partial sectional illustration of the nacelle inlet structure at another circumferential location.

Referring to FIG. 3, the aft cavity 112 may (or may not) be fluidly coupled with the forward cavity 100 through one or more ports 114 (e.g., access windows, etc.) in the forward bulkhead 64 and its forward bulkhead web 96. The aft cavity 112 may (or may not) also or alternatively be fluidly coupled with an internal compartment 116 between the fan case 44 (see FIG. 2) and each fan cowl 36 through one or more ports 118 (e.g., access windows, etc.) in the aft bulkhead 66.

Figure 4:
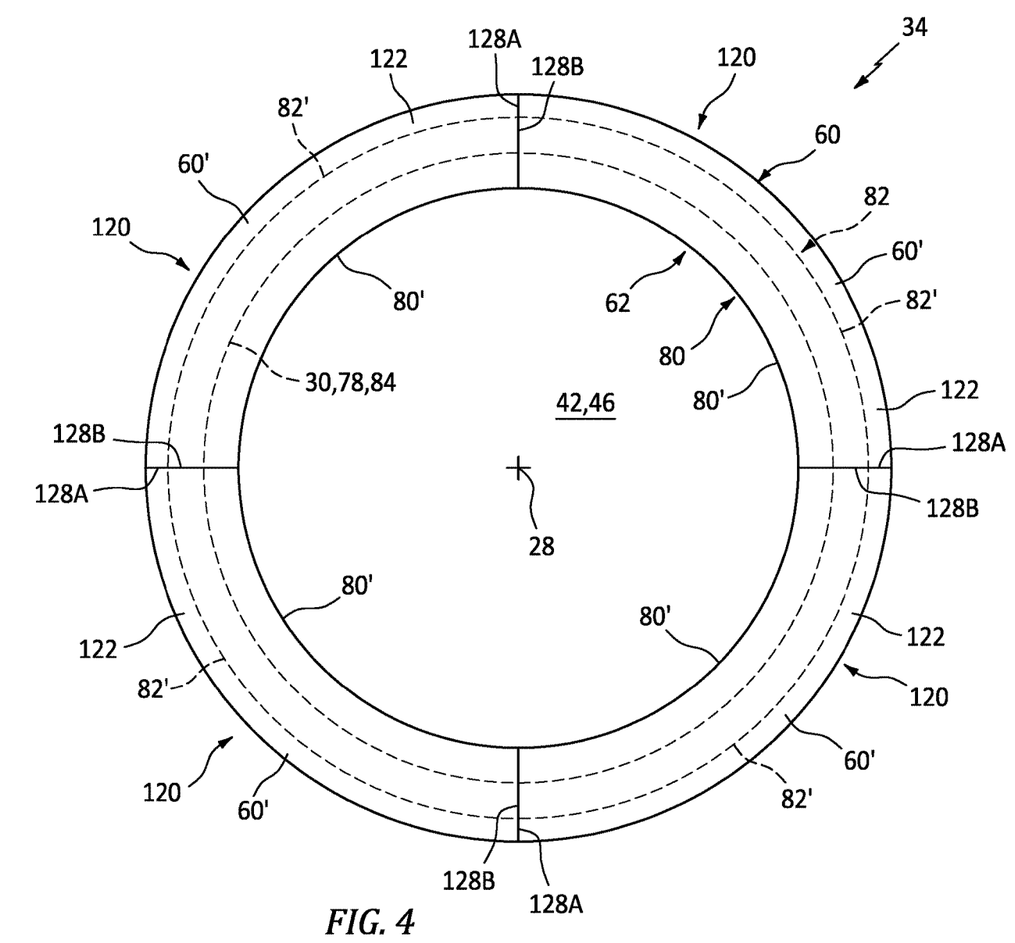
FIG. 4 is an end view illustration of the nacelle inlet structure.

Referring to FIG. 4, the inlet structure 34 includes a plurality of discrete circumferential inlet structure segments 120. These structure segments 120 are arranged circumferentially side-by-side around the axial centerline 28 in an array to collectively form one or more members of the inlet structure 34; e.g., the inlet lip 62 and the outer barrel 60 (see FIG. 2). Note, while the inlet structure 34 is shown with four (4) of the structure segments 120 in FIG. 4, the inlet structure 34 may alternatively include less than or more than four (4) of the structure segments 120 in other embodiments; e.g., two (2) or three (3) of the structure segments 120, five (5) or six (6) of the structure segments 120, etc. Referring to FIG. 2, one or more or all of the structure segments 120 each include a segment exterior skin 122, a segment mount 124 and an electric heater 126.

The exterior skin 122 may be configured as a relatively thin sheet or layer of continuous and uninterrupted material; e.g., non-perforated material. This exterior skin material may be constructed from metal; e.g., sheet metal. Examples of the metal include, but are not limited to, aluminum (Al) or an aluminum alloy, and titanium (Ti) and a titanium alloy. Alternatively, the exterior skin material may be constructed from a composite material; e.g., fiber-reinforced composite material. The exterior skin material, for example, may include a polymer (e.g., thermoplastic or thermoset) matrix and fiber-reinforcement (e.g., carbon fibers, fiberglass fibers, aramid fibers, etc.) embedded within the polymer matrix.

The exterior skin 122 may form a (e.g., entire) circumferential section of the inlet lip 62 and its inner lip portion 80 and its outer lip portion 82. The exterior skin 122 may also form a (e.g., entire) circumferential section of the outer barrel 60. Each exterior skin 122 of FIG. 4, for example, extends circumferentially about the axial centerline 28 between and to opposing circumferential sides 128A and 128B (generally referred to as "128") of the respective structure segment 120. The exterior skin 122 of FIG. 2 extends longitudinally from a longitudinal inner end 130 of the exterior skin 122 to a longitudinal outer end 132 of the exterior skin 122. The skin inner end 130 may be located at and/or form a circumferential section of the inlet lip inner aft end 86. The skin outer end 132 may be located at and/or form a circumferential section of the outer barrel aft end 76. With this arrangement, the exterior skin 122 includes an inner lip section 80', an outer lip section 82' and an outer barrel section 60'. The inner lip section 80' forms a (e.g., entire) respective circumferential section of the inner lip portion 80 of the inlet lip 62. The outer lip section 82' forms a (e.g., entire) respective circumferential section of the outer lip portion 82 of the inlet lip 62. The outer barrel section 60' forms a (e.g., entire) respective circumferential section of the outer barrel 60.

Figure 5:
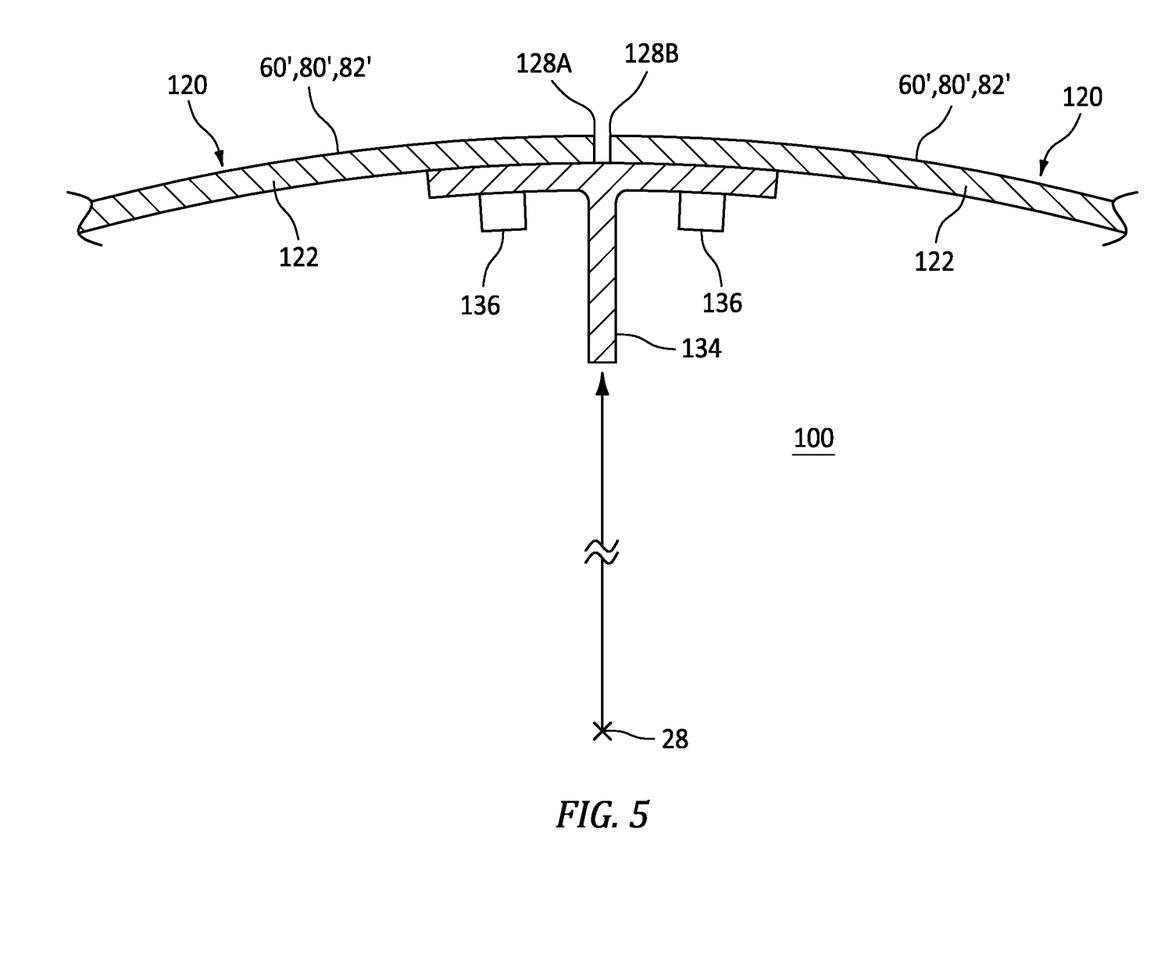
FIG. 5 is a partial cross-sectional illustration of the nacelle inlet structure at an interface between neighboring circumferential segments.

Referring to FIG. 5, at each segment side 128, each exterior skin 122 is disposed circumferentially next to a circumferentially neighboring (e.g., adjacent) exterior skin 122 at an inter-skin interface; e.g., a seam. At this inter-skin interface, the respective exterior skins 122 may be circumferentially engaged with (e.g., contact one another, abut against one another) or may be slightly circumferentially spaced from one another. Also at the inter-skin interface, the respective exterior skins 122 may be attached to one another through an axially extending coupler 134. More particularly, each exterior skin 122 may be (e.g., removably) mechanically attached to the respective coupler 134 by, for example, one or more fasteners 136; e.g., bolts, rivets, etc. Each fastener 136, for example, may project (e.g., radially) through the respective exterior skin 122 and a respective flange of the coupler 134.

Referring to FIG. 2, at the skin outer end 132, the exterior skin 122 may be mechanically fastened to the forward bulkhead 64 and/or the aft bulkhead 66. The exterior skin 122 of FIG. 2, for example, is removably attached to the forward bulkhead 64 and/or the aft bulkhead 66 by a plurality of fasteners 138 (one visible in FIG. 2); e.g., bolts. Each fastener 138 of FIG. 2 is mated with and projects through a respective fastener aperture in the exterior skin 122, a respective fastener aperture in the outer mounting structure 110, and a respective fastener aperture in the forward bulkhead outer flange 94. Here, each fastener 138 is threaded into a nut of a nut plate attached to an inner side of the forward bulkhead outer flange 94. The present disclosure, however, is not limited to such an exemplary arrangement.

Figure 6:
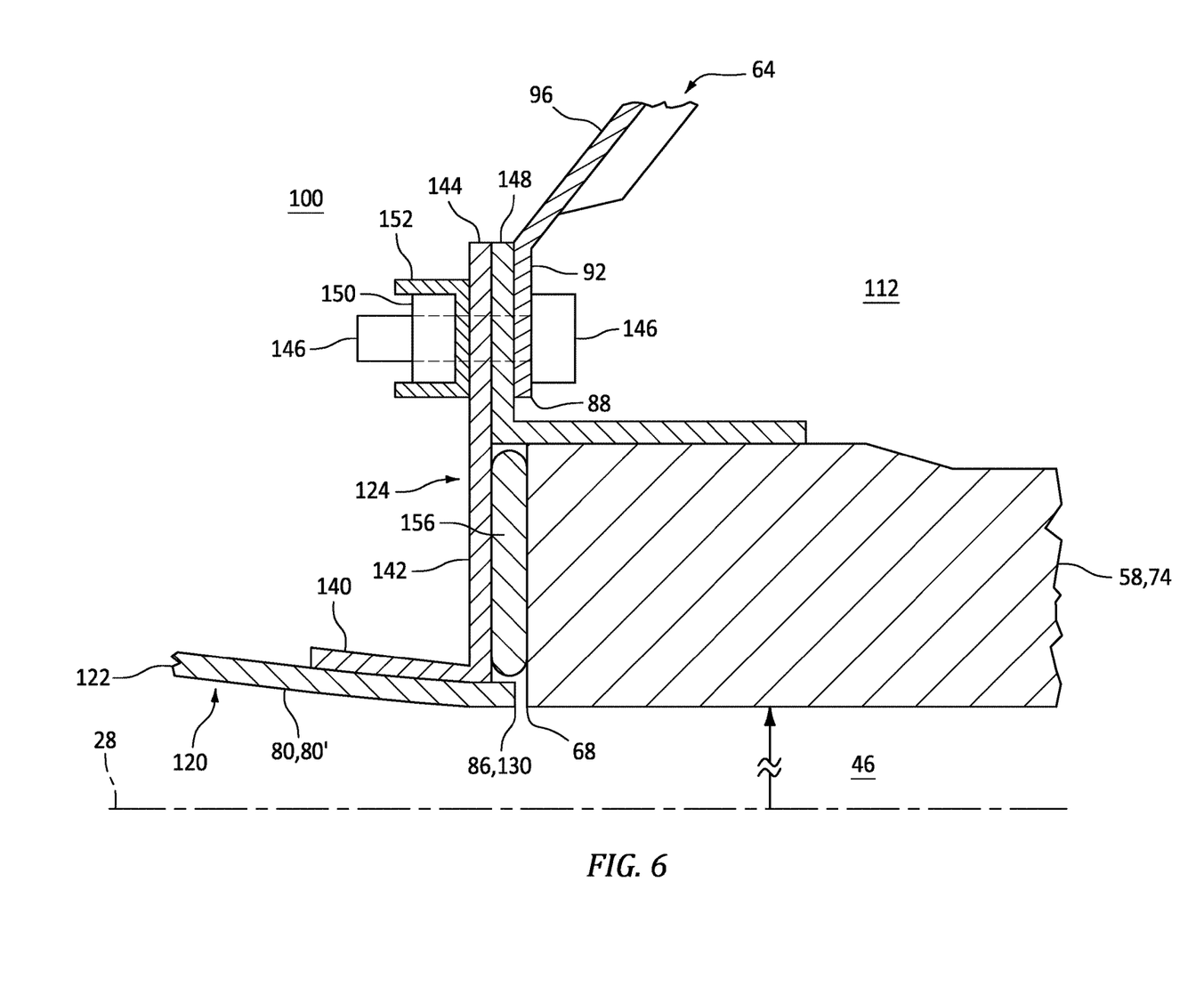
FIGS. 6 and 7 are partial sectional illustrations of various fastening arrangements between an inlet lip, an inner barrel and a bulkhead.

Referring to FIG. 6, the segment mount 124 is disposed within/along the forward cavity 100. This segment mount 124 is connected to the exterior skin 122. The segment mount 124 of FIG. 6, for example, includes a mount base 140 and a mount flange 142. The mount base 140 is bonded to (e.g., welded to, adhered to, consolidated with, etc.) the respective exterior skin 122 at the skin inner end 130. The mount flange 142 is disposed at the skin inner end 130. The mount flange 142 projects radially (in a radial outward direction away from the axial centerline 28) out from the mount base 140 to a radial distal end 144 of the segment mount 124 and its mount flange 142. The segment mount 124 and its mount flange 142 may be mechanically fastened to the inner barrel 58 and/or the forward bulkhead 64. The segment mount 124 of FIG. 6, for example, is removably attached to the inner barrel 58 and/or the forward bulkhead 64 by a plurality of fasteners 146 (one visible in FIG. 6); e.g., bolts. Each fastener 146 of FIG. 6 is mated with and projects through a respective fastener aperture in the forward bulkhead inner flange 92, a respective fastener aperture in a mount 148 (e.g., attach flange) of or otherwise attached to the inner barrel 58, and a respective fastener aperture in the mount flange 142. Here, each fastener 146 is threaded into a nut 150 of a nut plate 152 attached to a forward side of the mount flange 142. The present disclosure, however, is not limited to such an exemplary arrangement. For example, referring to FIG. 7, a pin 154 may alternatively project through the fastener aperture in the mount flange 142. With this arrangement, the pin 154 may radially and/or circumferentially locate/secure the segment mount 124 to the inner barrel 58. However, the segment mount 124 may move unrestricted along the respective pin 154 to facilitate easier installation and/or removal of the structure segment 120.

Figure 7:
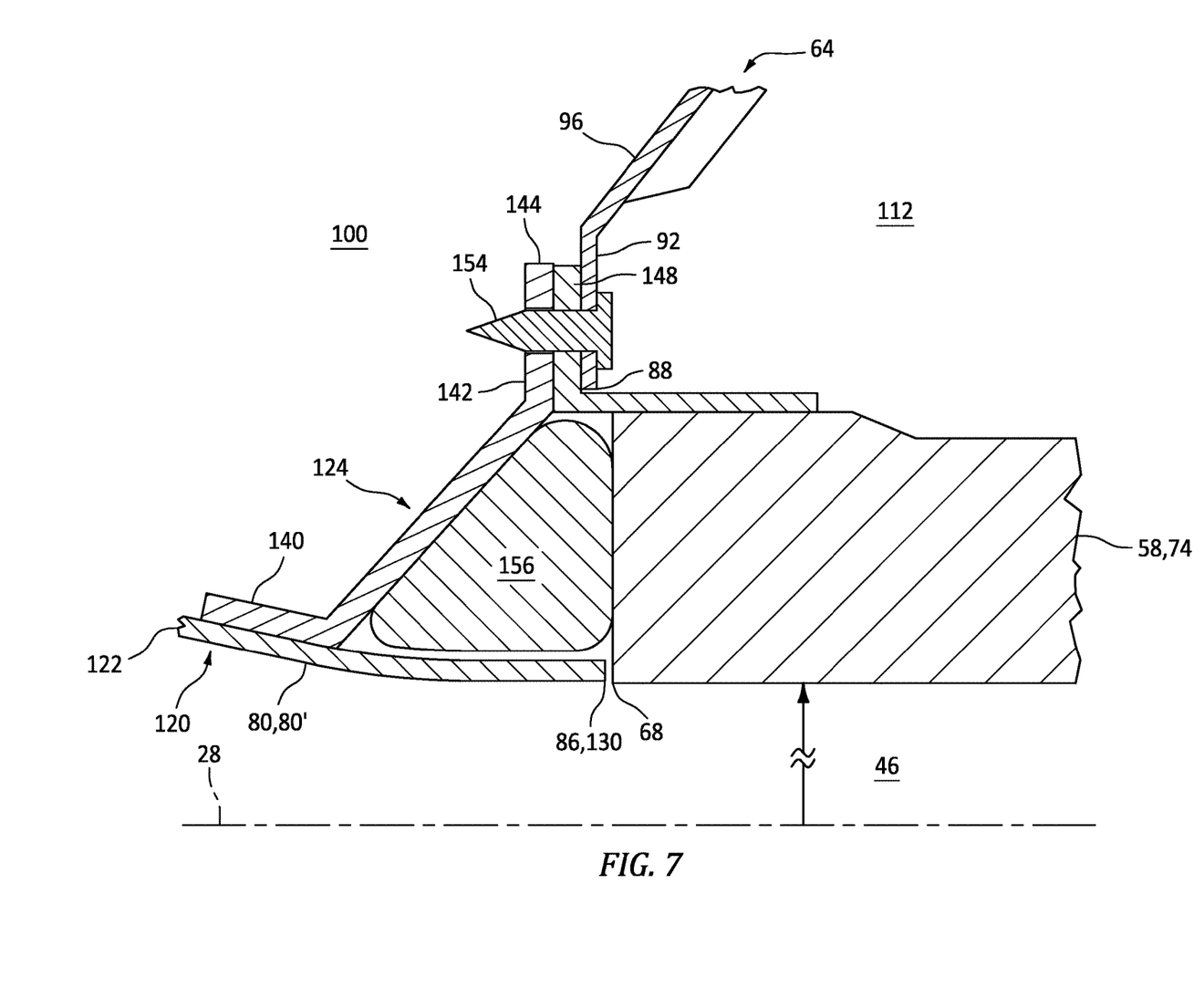

In some embodiments, referring to FIGS. 6 and 7, a seal element 156 may be included to seal a gap between the inner barrel 58 and the inlet lip 62. The seal element 156 of FIGS. 6 and 7, for example, is disposed axially between and engaged with each segment mount 124 and the inner barrel 58.

Figure 8A:
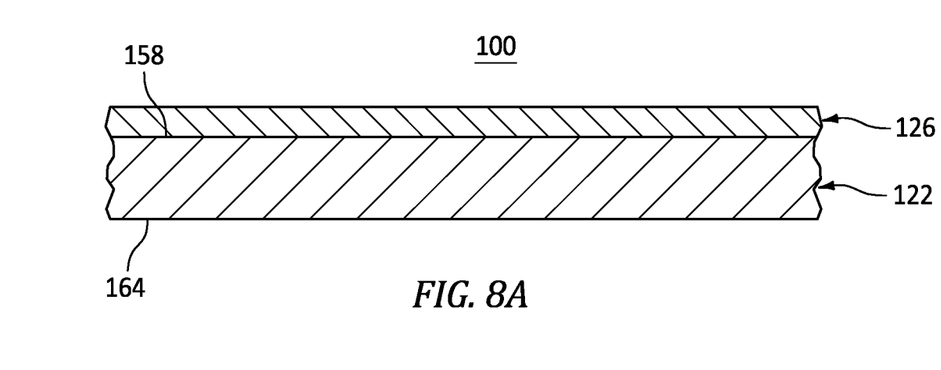
FIGS. 8A and 8B are partial schematic sectional illustrations of various skin-electric heater arrangements.
Figure 8B:
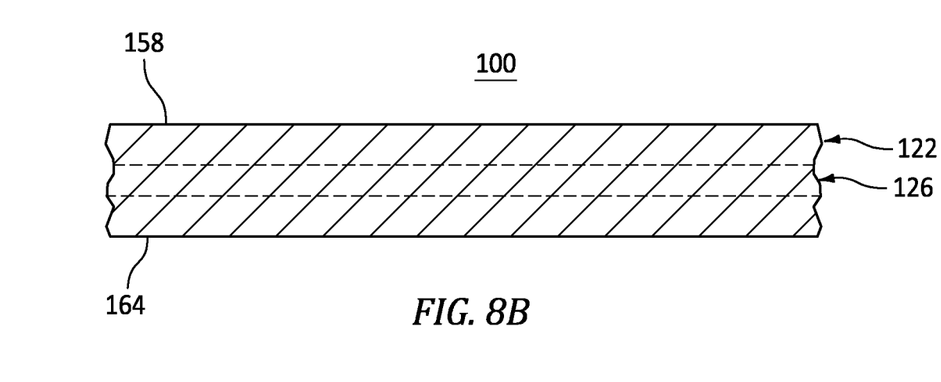

Referring to FIG. 2, the electric heater 126 is arranged with the exterior skin 122. The electric heater 126 of FIG. 2, for example, may extend longitudinally along at least a portion or an entirety of the inner lip section 80' and/or at least a portion or an entirety of the outer lip section 82'. Each electric heater 126 may extend circumferentially about the axial centerline 28 between and to (or about) the opposing segment sides 128 (see FIG. 4). In some embodiments, referring to FIG. 8A, the electric heater 126 may be disposed within/along the forward cavity 100. The electric heater 126, for example, may be bonded to or otherwise attached to an interior surface 158 of the exterior skin 122. In other embodiments, referring to FIG. 8B, the electric heater 126 may be integrated into the exterior skin 122. The electric heater 126, for example, may be embedded or otherwise incorporated into the exterior skin material.

Referring to FIG. 2, the anti-icing system 56 includes the electric heater 126 that is part of/integrated with each structure segment 120. The anti-icing system 56 also includes a controller 160 and an electrical power source 162; e.g., one or more batteries, an electric generator, etc. This anti-icing system 56 is configured to melt and/or prevent ice accumulation on each exterior skin 122 and its exterior surface 164, for example, at, along and near the leading edge 78. The controller 160, for example, may signal the power source 162 (or a switch and/or other regulator between the power source 162 and each electric heater 126) to provide electricity to each electric heater 126. The electricity energizers each electric heater 126 and its heating elements, and each electric heater 126 generates heat energy. The heat energy transfers (e.g., conducts) through the exterior skin material towards (e.g., to) the respective exterior skin exterior surface 164 (e.g., an exterior aerodynamic surface of the inlet structure 34) thereby heating that exterior skin exterior surface 164 to an elevated temperature. This elevated temperature may be selected to be warm enough to melt any ice accumulating on the respective exterior skin exterior surface 164 and/or prevent accumulation of the ice on the respective exterior skin exterior surface 164, while cool enough so as not to damage the respective exterior skin 122 (e.g., when made from the composite material) or any surrounding components and/or needlessly expend energy.

During propulsion system operation, the inlet structure 34 and one or more of its exterior skins 122 may be damaged (e.g., dented, fractured, etc.) when impacted by a foreign object; e.g., a relatively large bird. The inlet structure arrangement of the present disclosure is configured to facilitate relatively easy and/or fast repairs of the inlet structure 34 following such damage. Each damaged exterior skin 122, for example, may be unfastened and individually removed from the inlet structure 34 without requiring, for example, additional removal of adjacent (e.g., undamaged) exterior skins 122. In addition to facilitating relatively easy and/or fast repairs, costs associated with such repairs may also be reduced since only a portion (e.g., one or two of the exterior skins 122) of the inlet structure 34 may need to be repaired/replaced.

Figure 9:
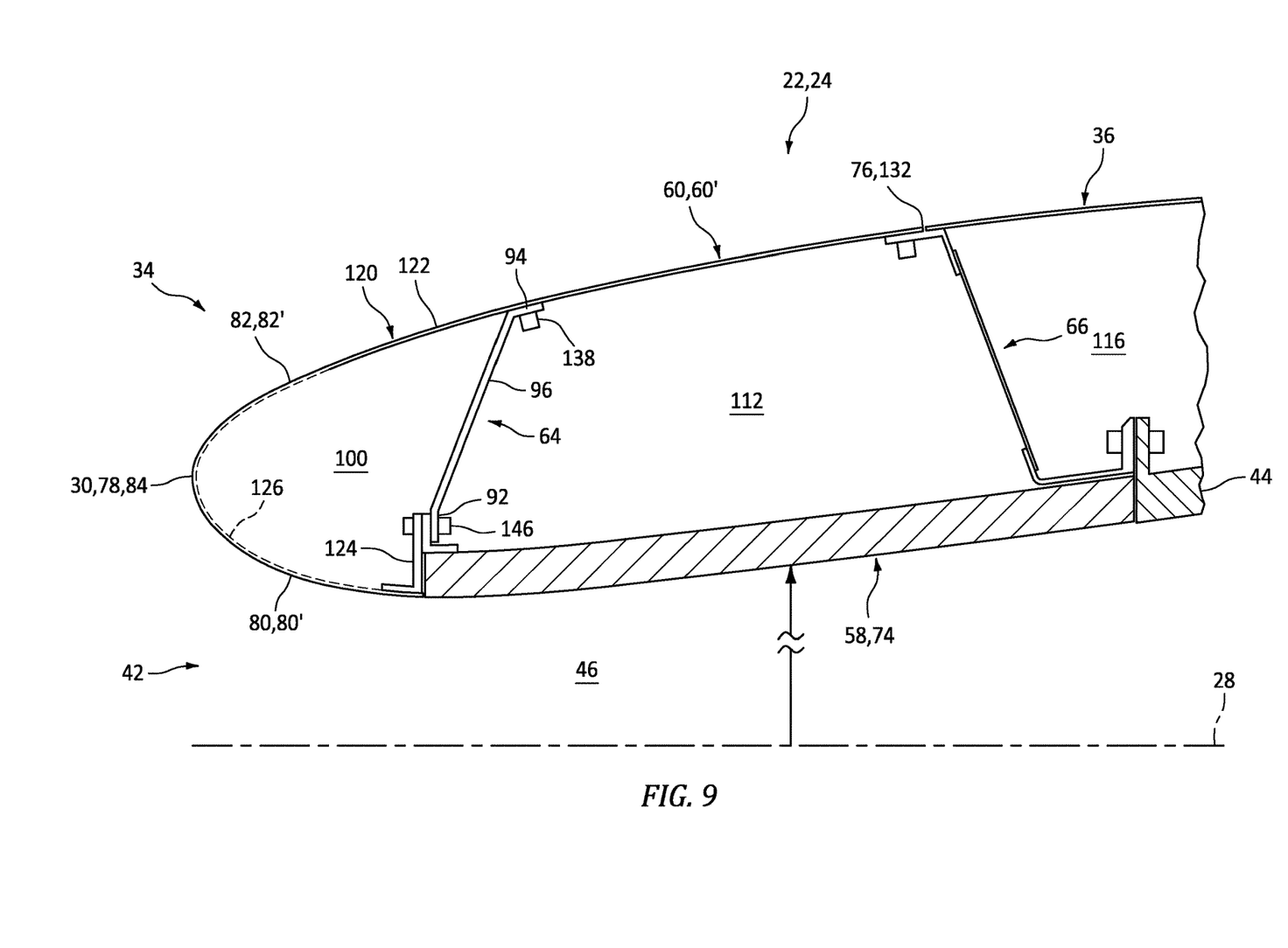
FIGS. 9-11 are partial sectional illustrations of the nacelle inlet structure with various bulkhead and exterior skin arrangements.

In some embodiments, referring to FIG. 9, the forward bulkhead 64 may be (e.g., removably) mechanically attached to an intermediate location axially along the outer barrel 60. With such an arrangement, the forward bulkhead 64 is axially spaced from the aft bulkhead 66 along the outer barrel 60.

Figure 10:
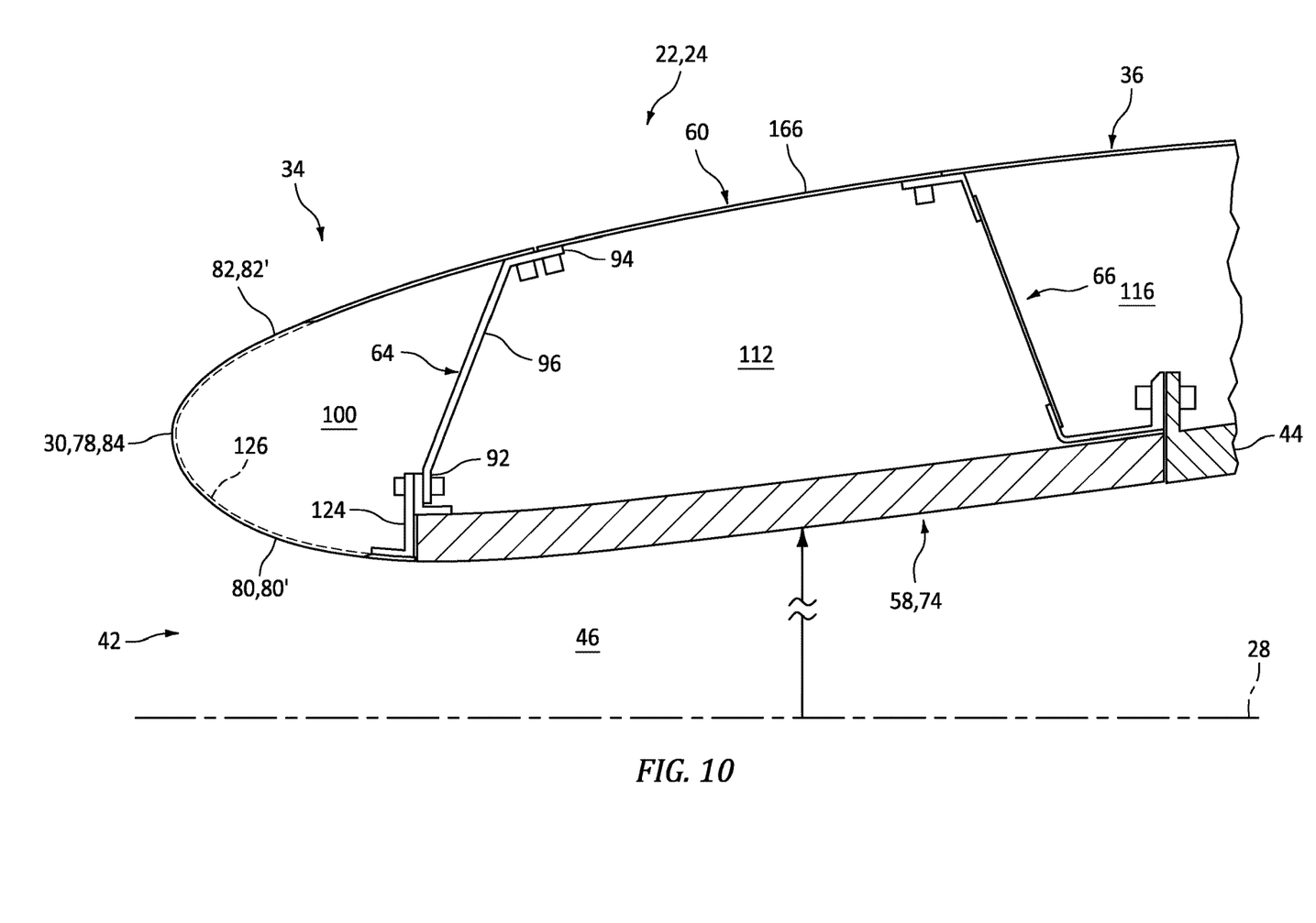

In some embodiments, referring to FIG. 10, the outer barrel 60 may be configured discrete from the inlet lip 62 and its outer lip portion 82. With such an arrangement, each exterior skin 122 forms the respective inner lip section 80' and the respective outer lip section 82', and is discrete from a skin 166 of the outer barrel 60. Here, each exterior skin 122 and the outer barrel 60 are (e.g., discretely) attached to and supported by the forward bulkhead 64.

Figure 11:
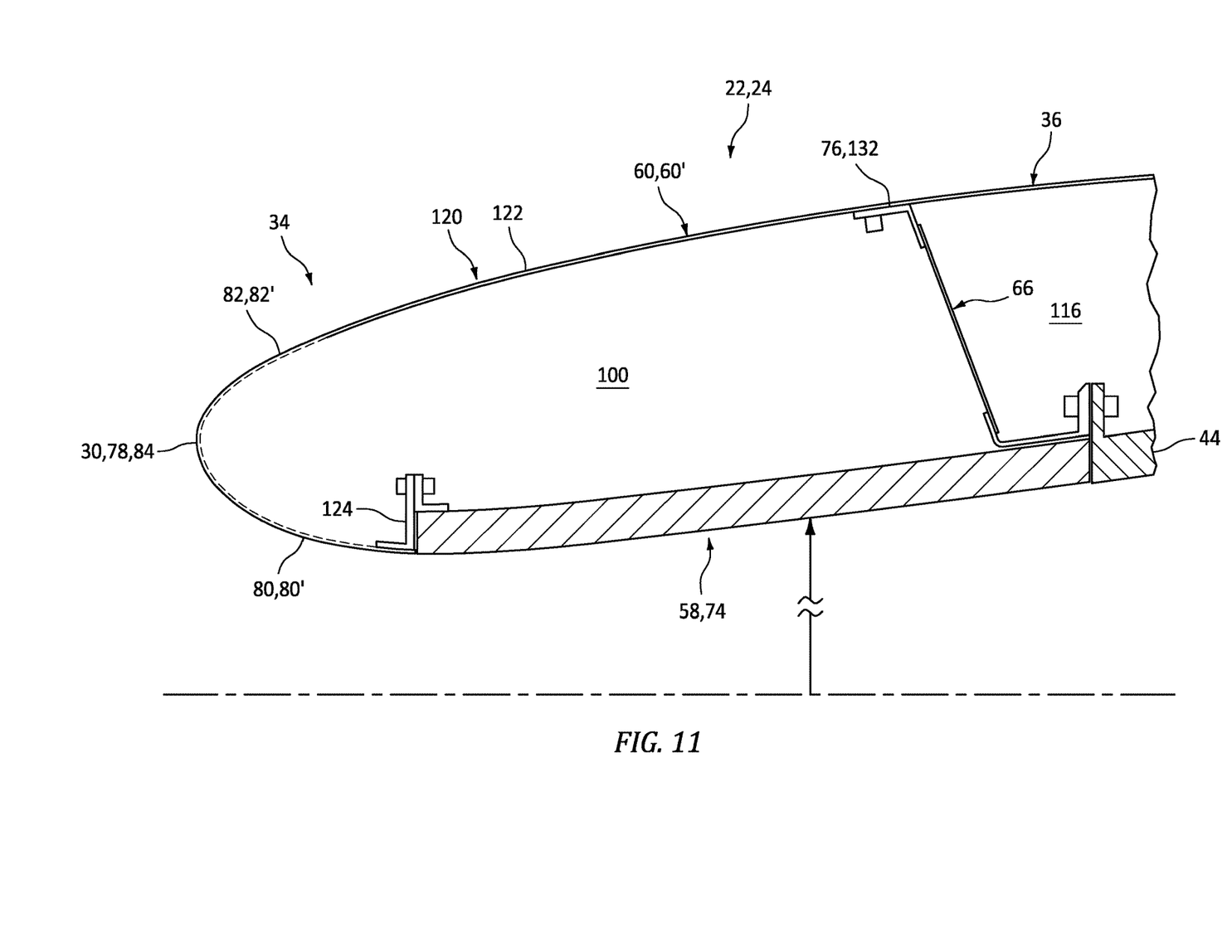

The forward bulkhead 64 of FIGS. 2, 9 and 10 may provide an additional barrier of protection for aft structures of the aircraft propulsion system 20 during a foreign object impact event. It is contemplated, however, a thickness of each exterior skin 122 may be increased such that forward bulkhead 64 may be omitted from the inlet structure 34. The inlet structure 34 of FIG. 11, for example, is configured without the forward bulkhead 64. With such an arrangement, the forward cavity 100 extends axially to the aft bulkhead 66. The forward cavity 100 also extends radially between and to the inner barrel 58 and the outer barrel 60.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
   a nacelle inlet structure extending axially along and circumferentially around a centerline, the nacelle inlet structure including an inlet lip, an inner barrel, an outer barrel, a bulkhead and a plurality of structure segments;
   the inlet lip forming a leading edge of the nacelle inlet structure;
   the inner barrel projecting axially aft away from the inlet lip;

the outer barrel projecting axially aft away from the inlet lip, and the outer barrel radially outboard of and axially overlapping the inner barrel;

the bulkhead connected to the inner barrel and the outer barrel, and the bulkhead radially tapering as the bulkhead extends axially towards the leading edge;

each of the plurality of structure segments including an exterior skin, a mount and an electric heater configured to heat the exterior skin;

the exterior skin forming a respective circumferential section of the inlet lip and a respective circumferential section of the outer barrel; and the mount bonded to the exterior skin and mechanically attached to the bulkhead and the inner barrel.

2. The assembly of claim 1, wherein the exterior skin includes an inner lip section, an outer lip section and an outer barrel section;

the inner lip section extends from the leading edge to an inner aft end of the exterior skin, and the mount is bonded to the inner lip section;

the outer lip section extends from the leading edge to the outer barrel section, and the outer lip section is radially outboard of and axially overlaps the inner lip section; and the outer barrel section extends from the outer lip section to an outer aft end of the exterior skin, and the outer barrel section is radially outboard of and axially overlaps the inner barrel.

3. The assembly of claim 2, wherein the nacelle inlet structure further includes an internal cavity; and the internal cavity extends radially from the inner lip section to the outer lip section.

4. The assembly of claim 3, wherein the internal cavity extends axially from the bulkhead to an intersection between the inner lip section and the outer lip section.

5. The assembly of claim 4, wherein the internal cavity extends radially from the bulkhead to the outer barrel section.

6. The assembly of claim 4, wherein the bulkhead is connected to the inner barrel at a forward end of the inner barrel; and the bulkhead is connected to the outer barrel at the outer aft end of the exterior skin.

7. The assembly of claim 4, wherein the bulkhead extends in a radially inward and axially forward direction from the outer barrel to the inner barrel.

8. The assembly of claim 4, wherein a fastener projects through the outer barrel section and a flange of the bulkhead.

9. The assembly of claim 4, wherein a fastener projects through the mount and a flange of the bulkhead.

10. The assembly of claim 1, wherein a fastener mechanically attaches the mount to the bulkhead and the inner barrel.

11. The assembly of claim 1, wherein a pin mechanically attaches the mount to the bulkhead and the inner barrel.

12. The assembly of claim 1, further comprising a seal element engaged with and axially between the mount and the inner barrel.

13. An assembly for an aircraft propulsion system, comprising:

a nacelle inlet structure extending axially along and circumferentially around a centerline, the nacelle inlet structure including an inlet lip, an inner barrel, an outer barrel, a bulkhead, a plurality of structure segments and an internal cavity;

the inlet lip forming a leading edge of the nacelle inlet structure;

the inner barrel projecting axially aft away from the inlet lip;

the outer barrel projecting axially aft away from the inlet lip, and the outer barrel radially outboard of and axially overlapping the inner barrel;

the bulkhead connected to the inner barrel and the outer barrel, and the bulkhead radially tapering as the bulkhead extends axially towards the leading edge;

each of the plurality of structure segments attached to the inner barrel and the bulkhead, each of the plurality of structure segments comprising an exterior skin, and the exterior skin forming a respective circumferential section of the inlet lip; and the internal cavity extending axially within the nacelle inlet structure from the exterior skin of each of the plurality of structure segments to the bulkhead;

wherein each of the plurality of structure segments further comprises a mount bonded to the exterior skin and mechanically attached to the bulkhead and the inner barrel.

14. The assembly of claim 13, wherein each of the plurality of structure segments further comprises an electric heater attached to or integrated with the exterior skin.

15. The assembly of claim 13, wherein the exterior skin further forms a respective circumferential section of the outer barrel.

16. The assembly of claim 13, wherein the exterior skin is discrete from and is axially adjacent the outer barrel; and the exterior skin is attached to the bulkhead.

17. The assembly of claim 13, wherein the exterior skin includes an inner lip section, an outer lip section and an outer barrel section;

the inner lip section extends from the leading edge to an inner aft end of the exterior skin, and the mount is bonded to the inner lip section;

the outer lip section extends from the leading edge to the outer barrel section, and the outer lip section is radially outboard of and axially overlaps the inner lip section; and the outer barrel section extends from the outer lip section to an outer aft end of the exterior skin, and the outer barrel section is radially outboard of and axially overlaps the inner barrel.

18. The assembly of claim 13, wherein a fastener mechanically attaches the mount to the inner barrel.

19. The assembly of claim 13, wherein a pin mechanically attaches the mount to the inner barrel.

20. The assembly of claim 13, further comprising a seal element engaged with and axially between the mount and the inner barrel.

* * * * *